C. C. VAUGHAN.
SPIRIT LEVEL FOR CONTRACTORS.
APPLICATION FILED APR. 22, 1910.

999,066.

Patented July 25, 1911.

Witnesses
Phil. E. Barnes
Charles Delevingne.

Inventor
Charles C. Vaughan,
By W. A. Edmonds
Attorney

COLUMBIA PLANOGRAPH CO., WASHINGTON, D. C.

UNITED STATES PATENT OFFICE.

CHARLES C. VAUGHAN, OF FLORENCE, ALABAMA.

SPIRIT-LEVEL FOR CONTRACTORS.

999,066.

Specification of Letters Patent. Patented July 25, 1911.

Application filed April 22, 1910. Serial No. 557,058.

*To all whom it may concern:*

Be it known that I, CHARLES C. VAUGHAN, a citizen of the United States, residing at Florence, in the county of Lauderdale and State of Alabama, have invented a certain new and useful Spirit-Level for Contractors, of which the following is a specification.

This invention relates to spirit levels, and it has for its object to provide a level for the use of contractors and builders for leveling foundations for buildings, or wherever it is desired to indicate a horizontal line between certain points, and it has for its object to provide a simple, comparatively inexpensive device for the purpose described adapted to accurately determine the level between widely separated points without the use of other instruments and it consists of the parts and combination of parts hereinafter described and claimed.

Figure 1:
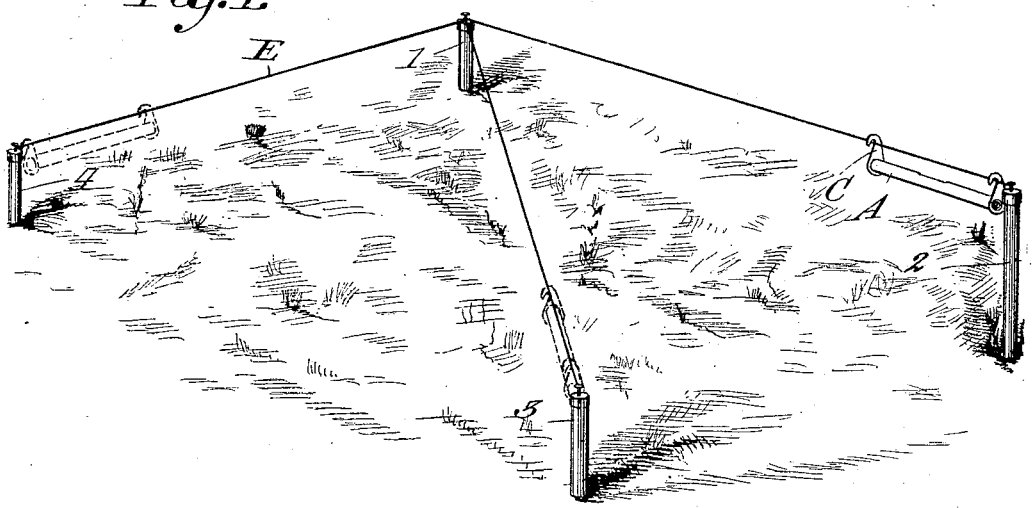
Figure 2:
Figure 3:
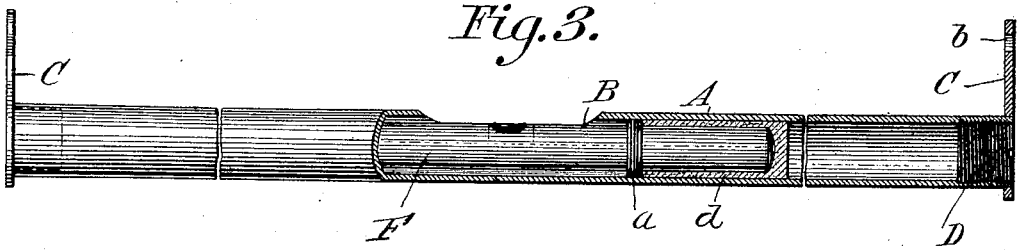
Figure 4:
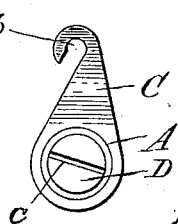

In the accompanying drawings forming a part of this specification, Figure 1 is a perspective view showing my improved level in use. Fig. 2 is a side elevation of the level. Fig. 3 is a side elevation partly in section showing the interior thereof. Fig. 4 is an end view.

Similar letters refer to similar parts throughout all the views.

Referring to the drawings A represents a tubular case of metal having a portion, as at B, removed through which the range of the bubble of the glass spirit tube F is disclosed.

The case A is formed with interior screw threads at each end which receive the screws D to close the same, said screws D being without shoulders and formed with threads extending their full length and notched, as at C, so as to adapt them to be driven in flush with the ends of the tubular case.

At each end of the case a hook C is secured in order to suspend the level from the mason's or other line E, as shown in Fig. 1, said hooks being preferably stamped from a metal plate and accurately fitted over the ends of the tubular casing and brazed or otherwise rigidly secured thereon, with the eyes $b$ in accurate alinement.

The glass spirit tube F is accurately positioned in the tubular casing by cords $a$, wrapped or wound on the tube at suitable distances from its ends and at points beyond the range of the bubble as the same is disclosed through the opening B. The cords serve to hold the tube centrally of the casing and out of contact with its wall and also to prevent the plaster $d$ employed to secure the tube in the casing from flowing or escaping into the opening B. Also this method of suspending the tube relieves it to a great extent from unequal pressure thereon due to the contraction and expansion of its envelop or tubular casing, thus avoiding throwing the tube out of true.

When in use for leveling a foundation the stakes 1, 2, 3 and 4, locating the corners of the foundation, are first driven, the stake 1 being first driven to the level or height desired: the stake 2 is then driven and the line E run from stake 1 and attached to stake 2 and the level suspended therefrom as shown, and the said stake 2, is then driven into the ground until the level shows a true horizontal line between said stakes, thus giving the proper level for the foundation between said stakes, and a similar course is followed to find the level between the stake 1 and the stake 3 and the stake 4.

Having thus described my invention what I claim is:

1. A spirit level, comprising a tubular case having a sight opening in the wall thereof, a spirit tube arranged in said casing and having cord wound thereon to isolate it from the wall of said casing, and means for securing said spirit tube in said casing.

2. A spirit level, comprising a tubular case having a sight opening in the wall thereof, a spirit tube within said case, a cord wound on said tube to isolate it from said case, means for securing said tube in said case, and means for suspending the case in a horizontal position.

In testimony whereof, I affix my signature, in the presence of two witnesses.

CHARLES C. VAUGHAN.

Witnesses:
N. C. ELTING,
TURNER RICE.